United States Patent Office 3,698,921
Patented Oct. 17, 1972

3,698,921
GLASS HAVING A HIGH COEFFICIENT OF ABSORPTION FOR INFRARED RADIATION COMPRISING FERROUS OXIDE
Coenraad Maria La Grouw and Ong Tjing Gie, Emmasingel, Eindhoven, Netherlands, assignors to U.S. Philips Corporation, New York, N.Y.
No Drawing. Filed Sept. 10, 1969, Ser. No. 856,824
Claims priority, application Netherlands, Sept. 14, 1968, 6813196; May 5, 1969, 6907225
Int. Cl. C03c 3/04
U.S. Cl. 106—54
1 Claim

ABSTRACT OF THE DISCLOSURE

Glass having a high coefficient of absorption for infrared radiation which is suitable as an envelope for electronic components which are sealed by irradiation and the composition of which is situated within the following limits in percent by weight:

| | |
|---|---|
| $SiO_2$ | 60–70 |
| $B_2O_3$ | 0–2 |
| $Li_2O$ | 0.5–2 |
| $Na_2O$ | 10–16 |
| $K_2O$ | 0–2 |
| BaO | 6–16 |
| $Al_2O_3$ | 1–4 |
| CaO+MgO | 0–5 |
| FeO | 2–4 |

---

The invention relates to glass having a high coefficient of absorption for infrared radiation and which is thus suitable as an envelope, for example, for a reed contact in a hermetically closed space or for a semiconductor device in which the relevant component can be sealed in a simple and quick manner by irradiation, for example, with the aid of a heating spiral.

The conventional lead-in metals are nickel-iron or nickel-iron wire having a copper coating, so-called Dumet-wire. The glass intended for the uses mentioned above must thus of course have a coefficient of expansion which is adapted to that of these lead-in metals, that is to say, 90 to $100 \times 10^{-7}$ in the range of 30 to 300° C.

Such glass which has a high coefficient of absorption for infrared radiation and which has a content of FeO for this purpose is known per se.

Sealing components of the above mentioned kind is in practice performed in accordance with a mechanized process in which a given gas atmosphere or vacuum is required. The latter depends on the material of the contacts or on the nature of the semi-conductor device which are enclosed in the envelope or on the nature of the lead-in metals. The sealing process is performed in a closed space within which the device for performing the treatments necessary for sealing and for supplying and removing the envelopes and the components to be sealed therein are present. Lubrication of the pivots with liquid or solid lubricants is as a rule not admitted in connection with contamination of the atmosphere which must be introduced into the envelope. In addition, the satisfactory operation of the sealed components is jeopardized due to the presence of some alien substance.

It is of course inadmissible that substances are released during sealing by the relevant components and also by the envelope glass which substances could be deposited elsewhere and thus cause contamination of the equipment and the atmosphere. The glasses known for the relevant purpose are not satisfactory in this respect. It is an object of the invention to provide glasses which do not have this drawback. In addition to coefficient of expansion and absence of constituents which are volatile at the sealing temperature the choice of these glasses is also bound to their softening point. Glasses having a softening point (this is the temperature at which the viscosity is $10^{7.6}$ poises) which is more than approximately 650° C. are more unsuitable for the relevant purpose as this temperature further exceeds this point.

Known glasses which contain PbO, fluorides and/or chlorides are unsuitable during sealing in connection with the release of these substances in vapour form. In addition PbO is unsuitable as a component of the glass because it makes processing in a reducing gas atmosphere impossible.

The glass according to the invention is characterized in that its composition lies within the range limited as follows, indicated in percent by weight:

| | |
|---|---|
| $SiO_2$ | 60–70 |
| $B_2O_3$ | 0–2 |
| $Li_2O$ | 0.5–2 |
| $Na_2O$ | 10–16 |
| $K_2O$ | 0–2 |
| BaO | 6–16 |
| $Al_2O_3$ | 1–4 |
| CaO+Mgo | 0–5 |
| FeO | 2–4 |

With regard to a still lesser risk of devitrification the compositions which are within the following range in percent by weight are preferred:

| | |
|---|---|
| $SiO_2$ | 60–70 |
| $B_2O_3$ | 0–2 |
| $Li_2O$ | 0.5–2 |
| $Na_2O$ | 12–16 |
| $K_2O$ | 0–2 |
| BaO | 6–12 |
| $Al_2O_3$ | 1.5–4 |
| CaO+Mgo | 3–5 |
| FeO | 2–4 |

Compositions within the following range in percent by weight are also preferred:

| | |
|---|---|
| $SiO_2$ | 60–70 |
| $B_2O_3$ | 0–2 |
| $Li_2O$ | 0.5–2 |
| $Na_2O$ | 10–14 |
| $K_2O$ | 0.5–2 |
| BaO | 10–16 |
| $Al_2O_3$ | 1–4 |
| CaO | 0–4 |
| FeO | 2–4 |

The following four compositions in percent by weight are mentioned by way of example, which compositions are obtained in the conventional manner by melting a mixture which contains the oxides or compounds from which the oxides are formed by pyrolysis during heating. Tube glass is drawn from this mixture.

TABLE

| | Composition (percent by weight) | | | |
|---|---|---|---|---|
| | 1 | 2 | 3 | 4 |
| $SiO_2$ | 64.7 | 64.4 | 66.0 | 66.8 |
| $B_2O_3$ | 1.9 | 2.0 | 2.0 | 2.0 |
| $Li_2O$ | 0.7 | 0.7 | 0.7 | 0.5 |
| $Na_2O$ | 11.4 | 12.8 | 12.8 | 15.0 |
| $K_2O$ | 1.0 | 1.0 | 1.0 | 0.3 |
| MgO | | | 0.6 | 2.7 |
| CaO | | 3.1 | 2.5 | 1.7 |
| BaO | 14.5 | 10.2 | 8.6 | 6.4 |
| $Al_2O_3$ | 2.8 | 2.9 | 3.1 | 1.9 |
| FeO | 3.0 | 2.9 | 2.7 | 2.7 |
| U.C. (30–300° C.) | 90 | 90 | 90 | 90 |
| Annealing point (° C.) | 465 | 473 | 486 | 483 |
| Softening point (° C.) | 643 | 649 | 653 | 658 |

The annealing point is the temperature at which the viscosity is $10^{13.4}$ poises; the softening point is the temperature at which the viscosity is $10^{7.6}$ poises.

The glasses were successfully used as envelopes for reed contacts in a hydrogen atmosphere. The contacts having lead-in wires of nickel-iron were sealed by means of an infrared radiator. Contamination of the mechanized equipment did not occur.

We claim:
1. Glass having a high coefficient of absorption for infrared radiation, particularly suitable as an envelope for electronic components which are sealed in the envelope by irradiation consisting essentially of a composition which lies within the range limited as follows in percent by weight:

| | |
|---|---|
| $SiO_2$ | 64.4–66.8 |
| $B_2O_3$ | 1.9–2 |
| $Li_2O$ | 0.5–0.7 |
| $Na_2O$ | 11.4–15 |
| $K_2O$ | 0.3–1.0 |
| $MgO$ | 0–2.7 |
| $CaO$ | 0–3.1 |
| $BaO$ | 6.4–14.5 |
| $Al_2O_3$ | 1.9–3.1 |
| $FeO$ | 2.7–3.0 | wherein said glass has a coefficient of expansion of approximately $90 \times 10^{-7}$ from 30° C. to 300° C., an annealing point from 465° C. to 486° C. and a softening point of 643° C. to 658° C.

References Cited

UNITED STATES PATENTS

| | | | |
|---|---|---|---|
| 2,688,559 | 9/1954 | Armistead | 106—52 |
| 2,688,560 | 9/1954 | Armistead | 106—52 |
| 2,719,932 | 10/1955 | Stanworth | 106—52 |
| 3,222,206 | 12/1965 | Cornelissen et al. | 106—52 |
| 3,466,180 | 9/1969 | Hagedorn | 106—52 |
| 3,326,703 | 6/1967 | Harrington | 106—54 |
| 3,464,932 | 9/1969 | Connelly et al. | 252—478 |
| 3,543,073 | 11/1970 | Sheldon | 313—92 |

FOREIGN PATENTS

| | | | |
|---|---|---|---|
| 1,123,857 | 8/1968 | Great Britain | 106—52 X |
| 1,163,482 | 9/1969 | Great Britain | 106—52 |

OTHER REFERENCES

Hoogendoorn et al., Infrared Absorbing Sealing Glasses Amer. Cer. Soc. Bull, 48 (1969).

Volf, M. B., Sealing Glasses in Technical Glasses, London, 1961, pp. 326–327.

JAMES E. POER, Primary Examiner

W. R. SATTERFIELD, Assistant Examiner

U.S. Cl. X.R.

106—52; 313—221